US012049779B2

(12) United States Patent
Lygin et al.

(10) Patent No.: US 12,049,779 B2
(45) Date of Patent: Jul. 30, 2024

(54) DOOR ACTUATOR ARRANGEMENT

(71) Applicant: dormakaba Deutschland GmbH, Ennepetal (DE)

(72) Inventors: Konstantin Lygin, Ennepetal (DE); Alexander Hellwig, Ennepetal (DE); Jan-Hendrik Jähnke, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 136 days.

(21) Appl. No.: 17/679,981

(22) Filed: Feb. 24, 2022

(65) Prior Publication Data

US 2022/0275676 A1 Sep. 1, 2022

(30) Foreign Application Priority Data

Mar. 1, 2021 (EP) .................................... 21160078

(51) Int. Cl.

*E05F 15/63* (2015.01)
*E05F 3/22* (2006.01)
*E05D 11/00* (2006.01)

(52) U.S. Cl.

CPC .............. *E05F 15/63* (2015.01); *E05F 3/227* (2013.01); *E05D 11/0081* (2013.01); *E05F 2015/631* (2015.01)

(58) Field of Classification Search

CPC ....... E05F 15/63; E05F 15/603; E05F 15/605; E05F 15/611; E05F 2015/631; E05F 15/70; E05F 3/227; E05Y 2900/132; E05D 11/0081

USPC .................................................... 49/339–345

See application file for complete search history.

(56) References Cited

U.S. PATENT DOCUMENTS

| | | | | |
|---|---|---|---|---|
| 5,551,740 A * | 9/1996 | Lin | E05F 3/221 | 292/262 |
| 5,901,412 A * | 5/1999 | Jentsch | E05F 3/104 | 16/60 |
| 10,030,426 B2 * | 7/2018 | Langenberg | E05F 15/63 | |
| 2013/0117985 A1 * | 5/2013 | Siraky | B25B 13/485 | 81/53.2 |
| 2014/0325911 A1 * | 11/2014 | Hass | E05F 3/224 | 49/31 |
| 2016/0369545 A1 * | 12/2016 | Bell | E05F 15/63 | |

(Continued)

FOREIGN PATENT DOCUMENTS

| | | |
|---|---|---|
| EP | 2933409 A1 | 10/2015 |
| EP | 3348765 A1 | 7/2018 |
| EP | 3483375 A1 | 5/2019 |

OTHER PUBLICATIONS

English translation of EP3483375A1 (Year: N/A).*
English translation of EP2933409A1 (Year: N/A).*

*Primary Examiner* — Justin B Rephann
(74) *Attorney, Agent, or Firm* — CANTOR COLBURN LLP

(57) ABSTRACT

A door actuator arrangement, comprising a door actuator having an output shaft, with the output shaft having a first face-side end and an opposing second face-side end, a linkage, whose linkage head is fitted on the first end of the output shaft and is connected to the output shaft in a rotationally fixed manner and a connection element. The connection element is connected or can be connected at the first end to the linkage head, protrudes into the output shaft and is accessible at the second end to make a connection between linkage head and output shaft.

14 Claims, 4 Drawing Sheets

(56) References Cited

U.S. PATENT DOCUMENTS

| | | | | |
|---|---|---|---|---|
| 2017/0275938 | A1* | 9/2017 | Langenberg ............ | E05F 15/70 |
| 2020/0340280 | A1* | 10/2020 | Oakley ................... | E05F 3/227 |

* cited by examiner

DOOR ACTUATOR ARRANGEMENT

CROSS-REFERENCE TO RELATED APPLICATIONS

This application is related to and claims the benefit of European Patent Application No. 21160078.8, filed on Mar. 1, 2021, the contents of which are herein incorporated by reference in their entirety.

TECHNICAL FIELD

The disclosure relates to a door actuator arrangement having a door actuator and an associated linkage. The disclosure also discloses a revolving door arrangement using the door actuator arrangement and a method for mounting the door actuator arrangement. Door closers and door drives are known from the state of the art, which are designated jointly as door actuators.

BACKGROUND

Door closers have a force storage device, for example a spring. This force storage device is charged when the door is manually opened by a person. The force storage device is discharged when the door is closed; the force storage device thereby discharges. There are also door closers in the state of the art with a servo drive, which assists the charging of the force storage device when the door is opened. The door drives, in contrast, have an electric or hydraulic drive, which applies the full force to open and/or close a door. A force storage device can be used in the door drive additionally for the drive.

The door drives usually have an output shaft. The output shaft is connected in a rotationally fixed manner to a linkage. The linkage transmits the force to the frame or wall when the door actuator is mounted on the door leaf. If, in contrast, the door actuator is attached to the frame or wall, then the linkage transmits the force to the door leaf.

SUMMARY

The present disclosure provides a door actuator arrangement which enables safe use of a door with simple mounting.

This advantage is achieved by the features of the independent claims. The dependent claims have advantageous configurations of the disclosure as their subject matter.

In the case of the conventional attachment and also in the case of the attachment of the linkage on the door actuator provided here according to the disclosure, the corresponding linkage head is fitted on the output shaft of the door actuator and connected to the output shaft. A connection means, for example a screw, is usually inserted through the entire linkage head here and screwed with the output shaft. As part of the disclosure however, it has been found that such a connection element penetrating the entire linkage head occupies a relatively large amount of installation space in the linkage head, which can possibly be used for cable routing. Furthermore, complex constructive measures have to be taken in the case of the conventional arrangement of the connection element in order to move the connection element past a cable located in the linkage head.

As part of the disclosure, the following door actuator arrangement is provided: The door actuator arrangement comprises a door actuator. The door actuator can in principle be designed as a door closer or door drive. In a preferred embodiment, it is provided that the door actuator is a door drive, which opens and/or closes a door via electromotively generated force.

The door actuator has an output shaft. This output shaft is set into rotation by the closer spring or electromotively in order to thus close and/or open the doors. The output shaft has two opposing face-side ends which are designated here as first end and second end. It is in particular provided that both ends of the output shaft are free for mounting a linkage such that the door actuator can be mounted in different ways, for example on the frame or on the door leaf, in DIN left mounting or DIN right mounting. In the case of the actual use however, the linkage is always only attached to one end, this end is designated here as the "first end".

The linkage can in principle be configured as desired and serves to transmit the force from the door actuator to the frame or wall or to the door leaf.

It is in particular provided that the linkage is designed as a scissors type linkage. In this case, the linkage comprises two levers rotatable in relation to one another; one of the two levers has the linkage head, which is mounted on the first end of the output shaft.

Alternatively, it is preferably provided that the linkage has a lever, which is mounted with its linkage head on the first end of the output shaft. At the other end of the lever is located a sliding piece which is received, guided linearly, in a slide rail. The lever is connected here in a rotationally movable manner to the sliding piece.

Regardless of the specific configuration of the linkage, the linkage head is fitted on the first end of the output shaft and connected in a rotationally fixed manner to the output shaft. It is in particular provided that for the rotationally fixed connection and therefore for the torque transmission, a form closure is provided between linkage head and output shaft. For example, the linkage head fits on the first end of the output shaft, with this plug-in connection being positive-locking via a corresponding inner polygon and outer polygon.

A "vertical axis" is advantageously defined for the further description of the disclosure. The output shaft rotates about this vertical axis; therefore, the vertical axis is vertical in the normal mounting of the door actuator.

The door actuator arrangement comprises a connection element for connecting the linkage head to the output shaft. The connection element is connected or can be connected at the first end to the linkage head. The connection between linkage head and connection element in the region of the first end of the output shaft can in principle be configured as desired, in particular in a positive-locking and/or non-positive-locking and/or frictional manner. In one embodiment, the connection element is e.g. a screw screwed into the linkage head. Therefore, the linkage head has an inner thread. In this case, the connection to the linkage head is achieved only when the connection element is screwed in, the connection element is therefore "connectable" to the linkage head. On the other hand, the connection element can e.g. also be an element fixedly connected to the linkage head, the connection element is therefore "connected" to the linkage head.

It is also provided that the connection element protrudes into the output shaft and is accessible at the second end for making a connection between linkage head and output shaft. This "accessibility at the second end" also means that the connection element is accessible "via" the second end, this is e.g. the case when the connection element protrudes into the output shaft, but does not protrude through the output shaft; in this case, the connection can be made e.g. by inserting a tool into the output shaft.

The connection between linkage head and output shaft by means of the connection element is thus, according to the disclosure, not made on the side of the linkage, but on the opposing side. Therefore, only the side of the linkage head facing the output shaft has to be designed to connect to the connection element. The connection element does not have to penetrate the entire linkage head and sufficient installation space remains, in particular for cable routing.

The connection element primarily serves to prevent the linkage detaching along the vertical axis. For the torque transmission, the rotationally fixed connection, in particular to the polygon, is preferably provided between linkage head and output shaft.

It is preferably provided that the connection element runs through a hole in the output shaft. This is in particular a through hole. The hole extends in particular along the vertical axis.

According to one variant, the connection element is introduced into the output shaft at the second end of the output shaft, penetrates the output shaft and is connected at the first end to the linkage head. It is preferably provided that the connection element, in particular a screw, has a head which is recessed at the second end of the output shaft in the output shaft. Accordingly, a recess is formed here on the second end of the output shaft. Such a recess is also particularly preferably located on the first end of the output shaft such that both ends can be used to fit a linkage for a flexible mounting of the door actuator.

It is preferably provided that the door actuator, in particular its output shaft, is also designed for the conventional mounting of a linkage. In the case of this conventional mounting, as described at the outset, the connection element in the form of a screw is inserted into the linkage head and connected to the output shaft via corresponding threads. An inner thread with a first nominal diameter is preferably provided in the hole of the output shaft. The connection element, in the variant as a screw, for the connection presented here between door actuator and linkage, has an outer thread with a second nominal diameter. It is preferably provided that the first nominal diameter is greater than the second nominal diameter. The first nominal diameter can, for example, be an inner thread with M6 and the second nominal diameter an outer thread with M5. As a result, the connection element fits loosely in the hole of the output shaft. In the case of a screw connection of the connection element to the linkage head, an inner thread with the second nominal diameter, for example M5, is of course provided in the linkage head.

A screw with the first nominal diameter, for example M6, can be used for the conventional mounting of the linkage on the output shaft in order to achieve a screwed connection between connection element and output axis.

According to another variant, the connection element is fixedly connected to the linkage head; in particular the connection element cannot be screwed or rotated with respect to the linkage head. The connection element protrudes through the output shaft and is fixed at the second end on the output shaft, whereby the connection between linkage head and output shaft is made. A nut is preferably screwed onto the connection element on the second end or another pull-out securing mechanism is affixed.

According to another variant, the connection element is rotatably connected to the linkage head and protrudes into the output shaft. The connection element has an outer thread, which can be screwed into an inner thread in the output shaft. At the same time as the linkage head is fitted, i.e. moving the linkage head parallel to the vertical axis, the connection element is screwed into the output shaft. To this end, the connection element is accessible via the second end; for example, a tool can be inserted via the second end to rotate the connection element.

According to another variant, the connection element is designed as an expanding mandrel. The expanding mandrel can already be fixedly connected to the linkage head in the unexpanded state and be connected to the output shaft through its expansion. On the other hand, the expanding mandrel can also be arranged and designed such that the connection to both elements, namely the linkage head and the output shaft, is achieved only by the expansion. In both cases, it is provided that the expanding mandrel is accessible from the second end for its expansion, e.g. the screwing-in or pressing-in of an expanding element. The "expanding of the expanding mandrel" means the same here as "making the connection between linkage head and output shaft".

Furthermore, it is preferably provided that at least one cable is guided through the linkage head into the door actuator. This cable preferably runs through the entire or through a part of the linkage and is guided through the linkage head into the door actuator. The cable is in particular designed to transmit power and/or data.

The linkage head preferably has an attachment region. The attachment region is designed to connect to the connection element. The attachment region particularly preferably has an inner thread to screw in the connection element. Furthermore, the attachment region can have a corresponding form closure region, which is connected to the output shaft in a positive-locking manner to transmit torque. The attachment region is facing the output shaft.

A hollow space is preferably located in the linkage head on the opposing side of the attachment region facing away from the output shaft. This hollow space is designed for cable routing. Accordingly, the cable preferably runs through this hollow space. In particular, the vertical axis runs through the hollow space. If the conventional connection between linkage and output axis were used, the connection element would run along the vertical axis through the hollow space and would hinder cable routing.

Furthermore, it is preferably provided that a cable channel is designed in the linkage head at the side of the attachment region, which leads from the door actuator into the hollow space. The cable can be laid from the door actuator in the hollow space through this cable channel.

The disclosure also discloses a revolving door arrangement, comprising one of the door actuator arrangements already described and a door leaf. The door leaf is rotatably received in a frame. The door actuator is mounted on the door leaf, the linkage is designed to be mounted on the frame or wall. In particular in the case of this mounting of the door actuator on the door leaf, there is the need for suitable cable routing to the door actuator.

The configurations explained as part of the door actuator arrangement according to the disclosure and dependent claims advantageously apply accordingly to the revolving door arrangement.

The disclosure also discloses a method for mounting a door actuator arrangement. This is preferably the door actuator arrangement described above. In the case of the method, a linkage head of a linkage is fitted on a first face-side end of an output shaft of a door actuator. Furthermore, a connection is made between linkage head and output shaft by means of a connection element, which is or can be connected at the first end to the linkage head, protrudes into the output shaft and is accessible at the second end for making the connection.

The configurations explained as part of the door actuator arrangement according to the disclosure and dependent claims advantageously apply accordingly to the method according to the disclosure.

BRIEF DESCRIPTION OF THE DRAWINGS

The disclosure will now be described further on the basis of exemplary embodiments, in which is shown.

DETAILED DESCRIPTION OF THE DRAWINGS

A revolving door arrangement 100 with a door actuator arrangement 1 is described below in detail on the basis of FIGS. 1 to 6. The door actuator arrangement 1 is mounted in the exemplary embodiments in accordance with the method according to the disclosure.

Figure 1:
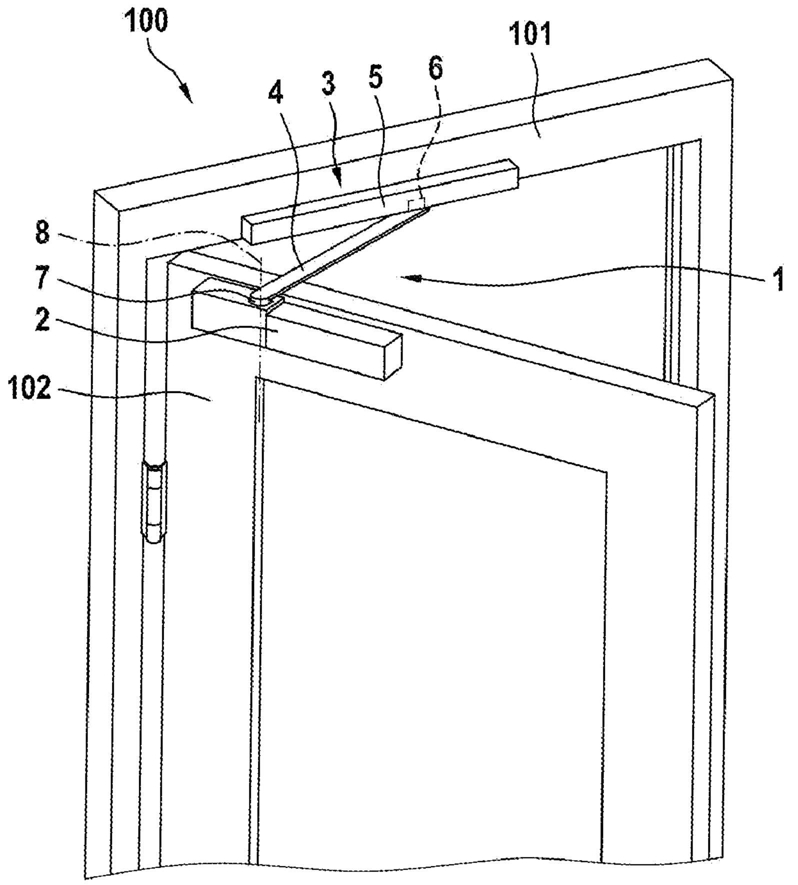
FIG. 1 a revolving door arrangement according to the disclosure having a door actuator arrangement according to the disclosure in accordance with all exemplary embodiments, FIGS. 2 and 3 sectioned views of the door actuator arrangement according to the disclosure in accordance with a first exemplary embodiment, FIG. 4 a detailed view of the door actuator arrangement according to the disclosure in accordance with all exemplary embodiments, FIG. 5 a sectioned view of the door actuator arrangement according to the disclosure in accordance with a second exemplary embodiment, and FIG. 6 a sectioned view of the door actuator arrangement according to the disclosure in accordance with a third exemplary embodiment.

FIG. 1 shows for all exemplary embodiments the revolving door arrangement 100 with a frame 101 and a door leaf 102 received in the frame 101 in a rotationally movable manner. Furthermore, the revolving door arrangement 100 comprises the door actuator arrangement 1.

The door actuator arrangement 1 comprises a door actuator 2, designed here as a door drive. The door actuator 2 is attached on the door leaf 102. Furthermore, the door actuator arrangement 1 has a linkage 3. In the example shown, the linkage 3 comprises a lever 4, which is connected to a sliding piece 6 in a rotationally movable manner. The sliding piece 6 is guided in a linearly movable manner in a slide rail 5. The slide rail 5 is attached to the frame 101.

Moreover, the lever 4 with a linkage head 7 is connected in a rotationally fixed manner to an output shaft 9 of the door actuator 2. The output shaft 9 of the door actuator 2 extends along a vertical axis 8.

Figure 2:
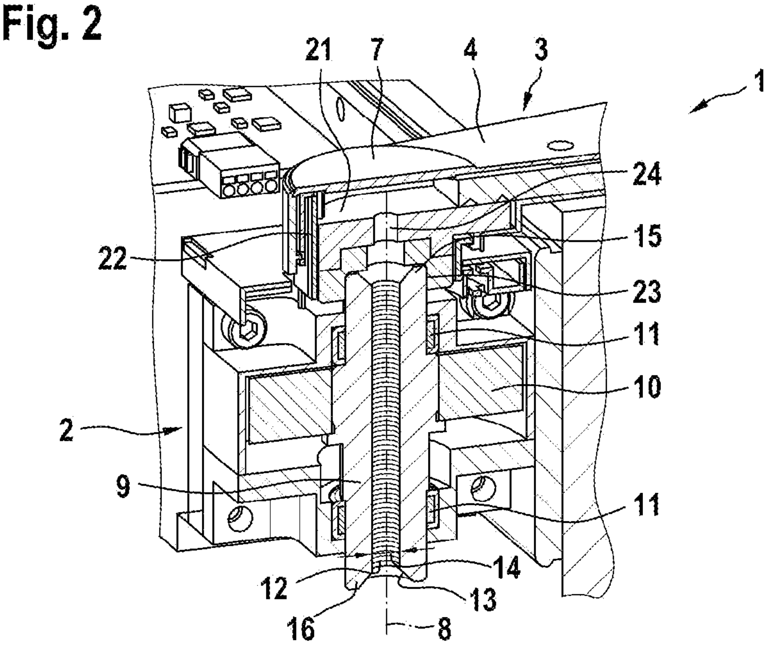
Figure 3:
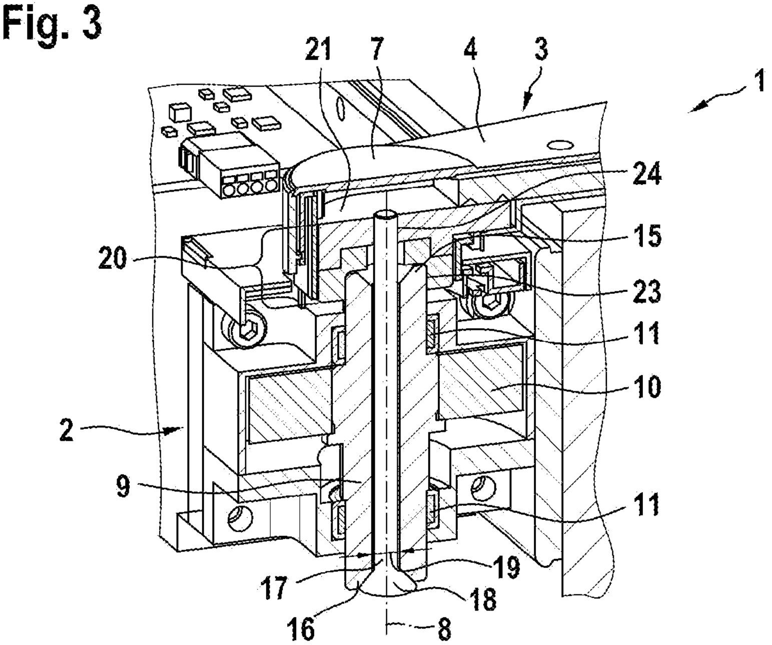
Figure 4:
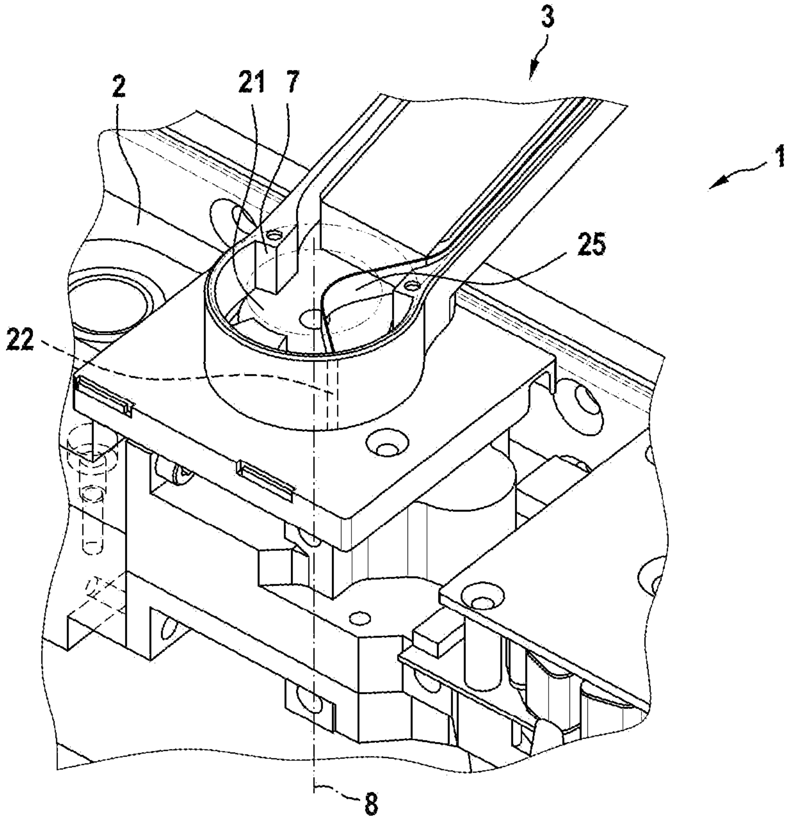

FIGS. 2 to 4 show in detail the connection between linkage head 7 and output shaft 9 by means of a connection element 17. In the sectioned view according to FIG. 2, the connection element 17 is hidden for the sake of clarity. In the sectioned view according to FIG. 3, the connection element 17 is shown. In the detailed view according to FIG. 4, an upper side of the linkage head 7 is represented transparently.

The output shaft 9 is mounted in the door actuator 2 so as to be rotationally movable via corresponding rotary bearings 11. Furthermore, the output shaft 9 is connected to an output element 10, for example a cam wheel or a gear wheel, in a rotationally fixed manner. This drive element 10 is, for example, set into rotation electromotively, whereby the output shaft 9 rotates about the vertical axis 8.

The output shaft 9 has two opposing face-side ends 15, 16. The end facing the linkage head 7 is defined as the first end 15. The opposing end lying below in the exemplary embodiment shown is defined as the second end 16.

The output shaft 9 penetrates a hole 12 with inner thread and first nominal diameter 14. A recess 13 is located at both ends 14, 15. The connection element 17 has a head 18, which is recessed in the recess 13 at the second end 16 of the output shaft 9.

The connection element 17 has an outer thread with second nominal diameter 19. The second nominal diameter 19 is smaller than the first nominal diameter 14 such that there is no screwed connection between connection element 17 and output shaft 9.

The linkage head 7 has an attachment region 20 on its side facing the output shaft 9. The attachment region 20 has a form closure region 23. In this form closure region 23 sits the outer contour of the output shaft 9 in a positive-locking manner for torque transmission.

Furthermore, the attachment region 20 has an inner thread 24 in which the connection element 17 is screwed.

Figure 5:
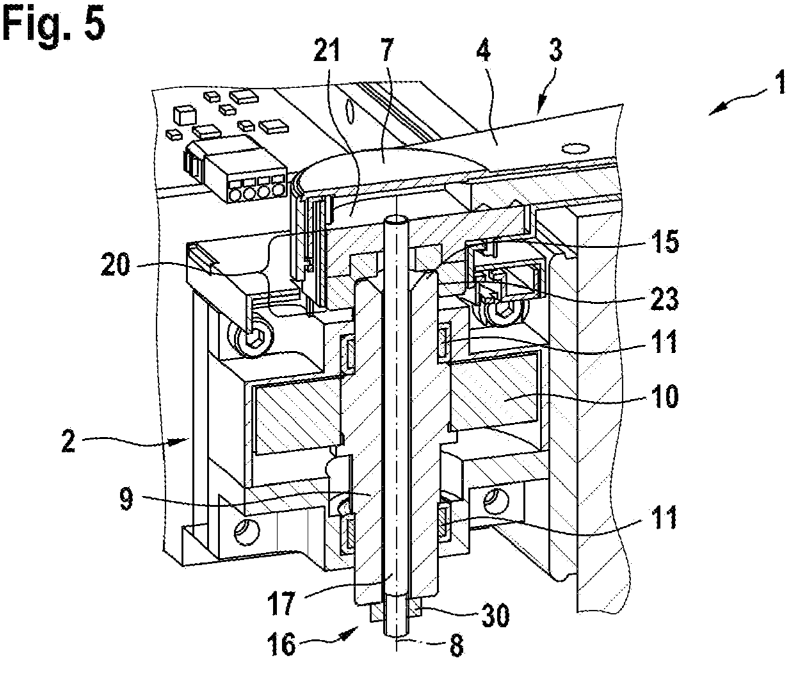

FIG. 5 shows an exemplary embodiment, in which the connection element 17 is fixedly connected to the linkage head 7; in particular the connection element 17 cannot thereby be screwed or rotated with respect to the linkage head 7. The connection element 17 protrudes through the output shaft 9 and is fixed at the second end 16 on the output shaft 9, whereby the connection is made between linkage head 7 and output shaft 9. A nut is screwed onto the connection element 17 on the second end as a pull-out securing mechanism 30.

Figure 6:
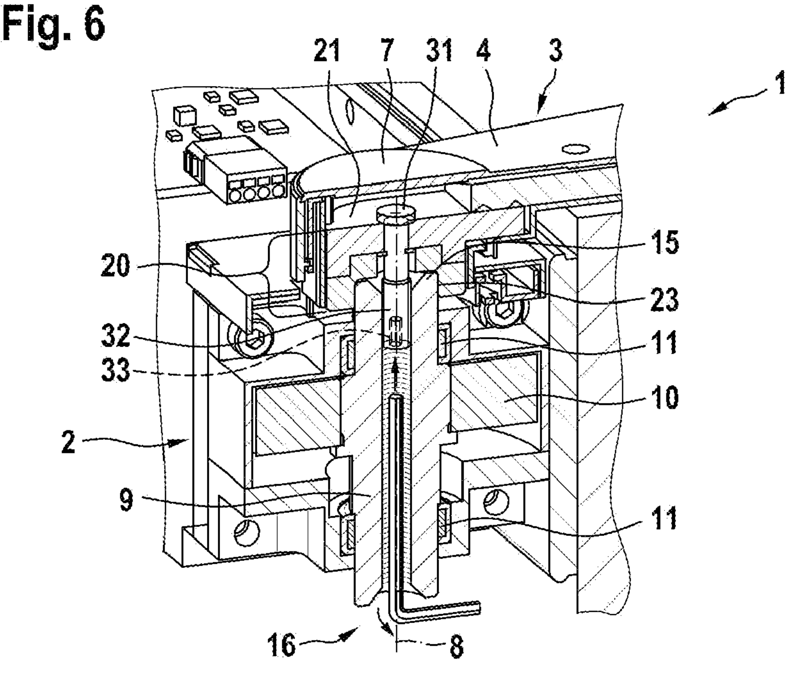

FIG. 6 shows an exemplary embodiment, in which the connection element 17 is rotatably connected to the linkage head 7 and protrudes into the output shaft 9. The connection element 17 has an outer thread 32, which can be screwed into an inner thread 32 in the output shaft 9. At the same time as the linkage head 7 is fitted, i.e. moving the linkage head 7 parallel to the vertical axis 8, the connection element 17 is screwed into the output shaft 9. To this end, the connection element 17 is accessible via the second end 16. To this end, the connection element 17 has a tool mount 33.

In all exemplary embodiments, a hollow space 21 is designed in the linkage head 7 over the attachment region 20. The vertical axis 8 penetrates this hollow space 21. However, the connection element 17 is configured in its length in particular such that it does not protrude or protrudes as little as possible into the hollow space 21.

As an overview of FIGS. 2 to 6 in particular shows, the hollow space 21 is used for cable routing for a cable 25. This cable 25 runs through the lever 4 and through the hollow space 21 and is guided through a cable channel 22 into the door actuator 2. This cable channel 22 runs at the side of the attachment region 20, but offset parallel to the vertical axis 8.

The invention claimed is:

1. A door actuator arrangement, comprising:

a door actuator having an output shaft, wherein the output shaft has a first face-side end and an opposing second face-side end, a linkage having a linkage head fitted on the first face-side end of the output shaft and is connected in a rotationally fixed manner to the output shaft, wherein the output shaft extends along a vertical axis and the linkage head is configured to move parallel to the vertical axis, and a connection element, which is connected at the first face-side end to the linkage head, protrudes into the output shaft and is accessible at the second face-side end for making a connection between linkage head and output shaft, and wherein the connection element runs through a hole in the output shaft, wherein the hole has an inner thread with a first nominal diameter, wherein the connection element has an outer thread with a second nominal diameter, wherein the first nominal diameter is greater than the second nominal diameter, such that the connection element fits loosely in the hole of the output shaft whereby there is no screwed connection between the connection element and the output shaft.

2. The door actuator arrangement according to claim 1, wherein the connection element is a screw introduced from the second face-side end into the output shaft and screwed into the linkage head.

3. The door actuator arrangement according to claim 2, wherein a head of the connection element is recessed on the second face-side end of the output shaft in the output shaft.

4. The door actuator arrangement according to claim 1, wherein the connection element is fixedly connected to the linkage head, protrudes through the output shaft and is fixed on the second face-side end, with a pull-out securing mechanism.

5. The door actuator arrangement according to claim 1, wherein the connection element is rotatably connected to the linkage head.

6. The door actuator arrangement according to claim 1, wherein the connection element is configured as an expanding mandrel.

7. The door actuator arrangement according to claim 1, wherein the linkage head comprises an attachment region for connecting to the connection element, wherein one side of the attachment region is facing the output shaft and on an opposing side of the attachment region a hollow space is designed in the linkage head for cable routing.

8. The door actuator arrangement according to claim 7, wherein a cable channel leads from the door actuator into the hollow space at the opposing side of the attachment region.

9. The door actuator arrangement according to claim 1, wherein at least one cable is guided through the linkage head into the door actuator.

10. The door actuator arrangement according to claim 1, wherein the door actuator is configured as a door drive.

11. The door actuator arrangement according to claim 1, wherein the linkage comprises two levers that are rotatable with respect to one another such that the linkage is configured as a scissors type linkage.

12. The door actuator arrangement according to claim 1, wherein the linkage comprises a lever connected in a rotationally fixed manner to the output shaft, a slide rail and a sliding piece guided linearly in the slide rail, wherein the lever is connected in a rotationally movable manner to the sliding piece.

13. A door arrangement, comprising the door actuator arrangement according to claim 1 and a door leaf, wherein the door actuator is mounted on the door leaf and the linkage is configured to be mounted on the frame or wall.

14. A method for mounting the door actuator arrangement according to the door actuator arrangement of claim 1, the method having the following steps:

fitting the linkage head of the linkage on the first face-side end of the output shaft of the door actuator, and making the connection between linkage head and output shaft by means of the connection element, which is or can be connected at the first face-side end to the linkage head, protrudes into the output shaft and is accessible at the second face-side end for making the connection.

* * * * *